July 22, 1969     F. J. RANNALLI     3,457,538
CONTROLLER
Filed Dec. 3, 1965
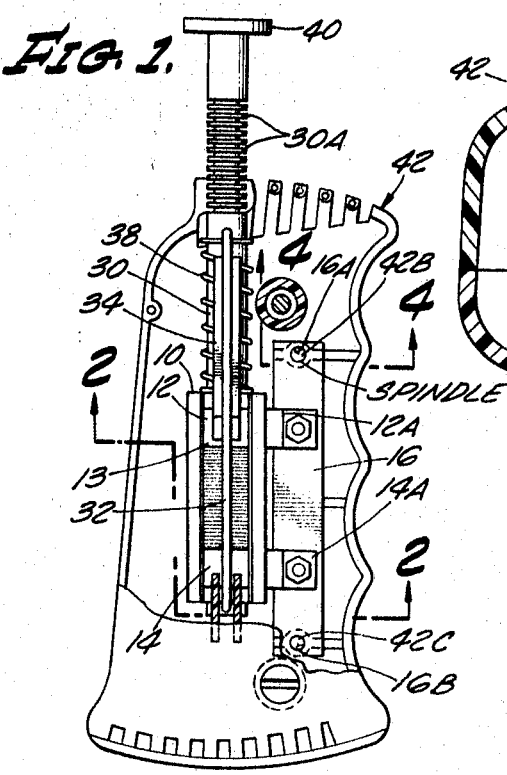
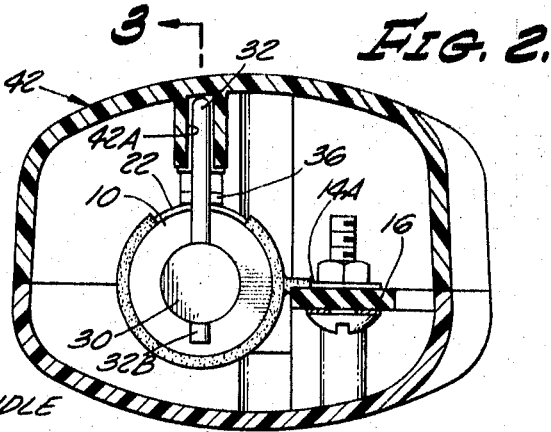
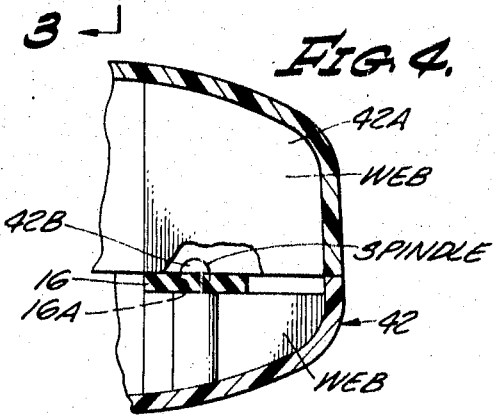
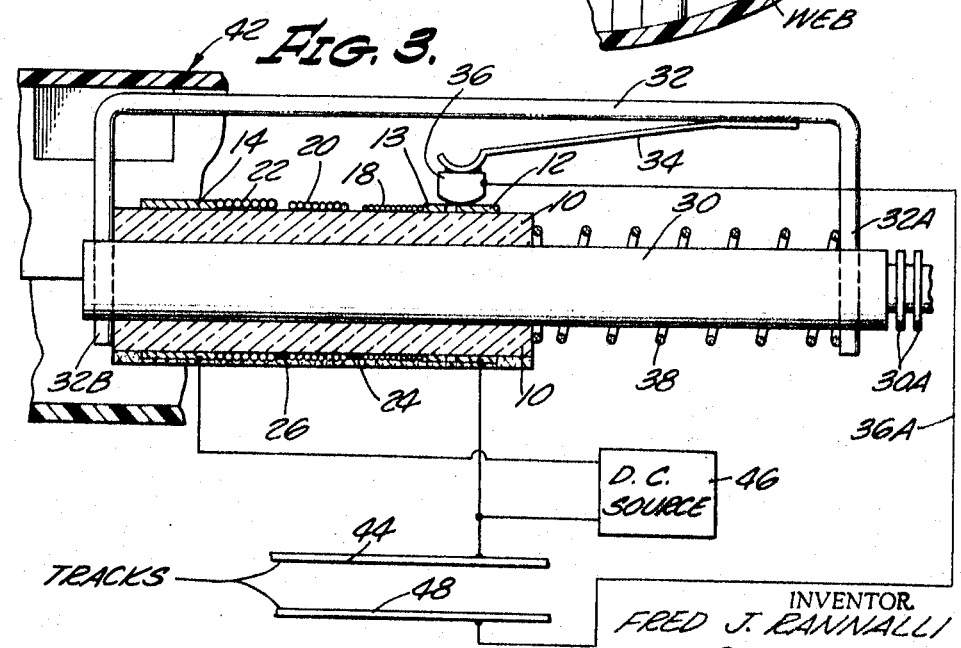
INVENTOR.
FRED J. RANNALLI
BY Lyon & Lyon
ATTORNEYS

United States Patent Office 3,457,538
Patented July 22, 1969

---

3,457,538
CONTROLLER
Fred J. Rannalli, Santa Ana, Calif., assignor to L. M. Cox Manufacturing Co., Inc., a corporation of California
Filed Dec. 3, 1965, Ser. No. 511,482
Int. Cl. H01c 5/02, 1/02, 1/12
U.S. Cl. 338—176                             11 Claims

ABSTRACT OF THE DISCLOSURE

A manually operable circuit controller for racing a miniature electric auto traveling on tracks. A movable wiper arm is normally spring urged away from a special resistance into contact with a stationary band, such band and wiper being connected across the tracks to normally short-circuit the track and dynamically brake the car. In starting, the wiper is moved manually from such band onto spirally wound wires of the special resistance, the wires being progressively of larger diameter and being then in a series circuit with a voltage source and the car motor.

---

The present invention relates to controllers particularly useful in the control of miniature automobiles having an electrical motor that serves as the engine.

Motors for this purpose, are usually controlled by a rheostat connected in a series circuit with the motor and a D.C. source.

Briefly, as described herein, there is provided a rheostat comprising three different size resistance wires connected in series between two bands with the junction points of the resistance wires being equally spaced from each other and from such bands, these wires being of increasing diameter and being contactable by a wiper which, together with the resistance wires and an associated motor, are so connected in a series circuit with a D.C. source, that the wires of smaller diameter are removed from the circuit as a greater voltage and hence greater current is applied to the motor. A spring urges the wiper to a position remote from the wire of greatest diameter, i.e., toward a minimum current position and indeed in accordance with other features of the invention, urges the contact to engagement with a third band which is electrically isolated from the resistance wires and is connected to one terminal of the motor such that a short circuit then is created across the motor terminals to achieve dynamic braking. Other features of the present invention involve constructional details resulting in a small, inexpensive unit of minimum parts that are easy to construct and assemble and capable of assuring good contact and heat dissipation and long life.

It is therefore a general object of the present invention to provide a controller having the above indicated features.

A specific object of the present invention is to provide a controller of this character having dynamic braking capabilities.

Another specific object of the present invention is to provide a linearly actuated contact which is normally spring urged and whose position with some degree of linearity is related to the speed of a motor controlled thereby with the resistance wire contacted by such contract being of greater diameter the greater the speed of the motor.

Another specific object of the present invention is to provide a novel construction for a combination speed and dynamic brake unit for the above indicated purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates substantially in full scale a view in elevation of a control embodying features of the present invention with a portion of the casing in which such control is mounted being broken away to show internal constructional features;

FIGURE 2 is a sectional view, on larger scale, taken substantially as indicated by line 2—2 in FIGURE 1;

FIGURES 3 and 4 are sectional views, on larger scales, taken substantially as indicated by corresponding lines 3—3 and 4—4 in FIGURES 2 and 1 respectively.

The unit includes a cylindrical core or ceramic form 10 around which spaced metallic bands 12, 13, 14 extend, the outer bands 12, 14 being formed with eyelet portions 12A, 14A that serve as electrical binding posts and also as supports for attachment to an insulating mounting strip 16.

Three different diameter resistance wires 18, 20, and 22 are wound on form 10 with the adjacent ends of the wires being welded to each other at junction points 24 and 26, the beginning end of wire 18 being welded to band 13 and the last end of wire 22 being welded to band 14.

The wires 18, 20 and 22 are progressively in that order, of larger diameter so that the ohmic resistance between band 13 and junction 24 is 12.5 ohms, between points 24 and 26 is 4.5 ohms and between point 26 and band 14 is 1.25 ohms, with the points 24, 26 dividing the distance between bands 13 and 14 in three equal sections in each of which there is a different size wire as previously indicated.

An aluminum rod 30 extends through the cylindrical core 10 with a copper wire 32 having bent ends 32A, 32B passing through and secured within space apertured portions of rod 30. A resilient wiper arm 34 of thin sheet stock has one of its ends secured to an intermediate portion of wire 32 and the other end of resilient arm 34 mounts a bulbous contact 36.

A coil compression spring 38 has one of it ends bearing on form 10 and the other one of its ends bearing against bent end 32A of wire 32 to thereby normally position or urge the bulbous contact on the band 12, the other bent end 32B of wire 32 contacting the core 10 to limit movement of the wiper contact 36.

The rod 30 is prolonged and mounts a button 40 of insulating material. An intermediate portion of rod 30 is formed with a plurality of circumferential grooves to provide a series of heat radiating fins 30A.

The unit described is mounted inside of a ventilated two piece plastic casing 42 using, for example, mounting holes 16A, 16B in the mounting strip 16 engaging spaced spindle portions 42B and 42C formed on the casing 42, the casing 42 being also formed with a grooved portion 42A through which the wire 32 extends and within which it is guided and retained in operation of the device.

The metallic band 12 is connected to one of the two tracks 44 and also to one terminal of a DC source 46, metallic band 14 being connected to the other terminal of source 46. The other track 48 is connected to the wiper contact 36 via wire 36A. The contact 36 engages band 12 only in the released condition (shown in FIGURE 3) of the control wherein the DC source 46 is disconnected, i.e., contact 36 does not engage band 13 in that condition.

It will be appreciated that the motor (not shown) of the miniature racing car has opposite ones of its terminals connected to opposite track terminals 44, 48 and that a greater amount of voltage and also current is applied to such motor the closer the contact 36 is moved toward the band 14 and these values are maximum when the contact 36 engages band 14. In this latter condition the speed of the motor is greatest. When finger pressure on button 40 is thereafter gradually relaxed less voltage and current is supplied and the motor speed decreases. Ultimately with no finger pressure contact 36 engages band 12, referred to as a brake band, since under this condition the track 44, 48 is short circuited which means that the armature of the motor, now functioning as a D.C. generator is short circuited and dynamic braking is being achieved. This dynamic braking assures quick stopping of the motor.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:
1. In a controller of the character described, a cylindrical hollow core; a resistance wire winding on said core; a pair of spaced metallic bands on said core between which said winding is disposed with opposite ends of said winding being connected to a corresponding one of said bands; said hollow core having a cylindrical opening therethrough; a metallic rod extending through said opening and being guided thereby; a generally U-shaped metallic element straddling said core and having opposite ends thereof attached to spaced regions of said rod; a resilient wiper having one of its ends attached to an intermediate portion of said element and the other one of its ends engaging said winding; a coil compression spring encircling said rod and having one of its ends bearing on said core and the other one of its ends bearing on one end of said element; a casing; means mounting said core on said casing; guide means on said casing and cooperating with said element for guiding its movement; said rod having a portion extending through said casing.

2. A controller as set forth in claim 1 in which said core includes a third band; said third band being engageable with said wiper.

3. A controller as set forth in claim 1 in which said resistance wire winding comprises a plurality of windings connected in series between said pair of bands with the diameter of the wire in adjacent ones of said windings being different and of progressively larger diameter.

4. A controller as set forth in claim 1 including an insulating mounting strip, a third band on said core normally contacted by said wiper, said third band and one of said pair of spaced metallic bands each having a lug connected to said mounting strip.

5. A controller as set forth in claim 1 in which said portion of said rod extending through said casing has heat radiating fin portions.

6. In a controller of the character described, a cylindrical hollow core; a resistance wire winding on said core; a pair of spaced metallic bands on said core between which said winding is disposed with opposite ends of said winding being connected to a corresponding one of said bands; said hollow core having a cylindrical opening therethrough; a rod extending through said opening and being guided thereby; a metallic element attached to said rod; a resilient wiper having one of its ends attached to said element and the other one of its ends engaging said winding; abutment means on said rod; a coil compression spring encircling said rod and being compressed between said core and said abutment means; a casing; means mounting said core on said casing; cooperating guide means between said casing and said rod for guiding its movement; said rod having a portion attached thereto extending through said casing for manual operation, said element serving also as a stop member for limiting the movement of said rod by said spring.

7. A controller as set forth in claim 6 in which said core includes a third band; said spring normally urging said wiper into engagement with said third band.

8. A controller as set forth in claim 7 in which said resistance wire winding comprises a plurality of windings connected in series between said pair of bands with the diameter of the wire in adjacent ones of said windings being different and of progressively larger diameter.

9. A controller as set forth in claim 8 in which said wiper is connectable to one of a pair of track members; said third band being connectable to the other of said pair of track members whereby said spring normally positions said wiper to short-circuit said track members.

10. In a controller of the character described, a rheostat comprising a core; a resistance wire winding on said core; a wiper; means mounting said wiper for longitudinal movement on said core and for contacting a portion of said winding in movement of said wiper from one extreme position to a second extreme position; spring means urging said wiper in one of said extreme positions; said resistance wire winding comprising a plurality of windings connected in series and progressively of larger diameter wire; said spring means urging said wiper away from contact with that wire of greatest diameter; said winding being connected between a pair of spaced bands on said core; said pair of bands being contactable by said wiper; a third band on said core; and said spring means normally urging said wiper into contact with said third bands; said wiper being connectable to one of a pair of track members; said third band being connectable to the other of said pair of track members whereby said spring normally positions said wiper to short-circuit said track members.

11. In combination in a hand-held speed controller for electrically-powered model racing cars and the like: a handle containing an interior compartment sized to house a rheostat, a rheostat having a coil wound onto the cylindrical exterior of a hollow tubular core mounted in said handle compartment, an electrical contact mounted for sliding movement along the rheostat coil, actuating means having a portion thereof accessible to the operator on the outside of the handle connected to the sliding contact and operative to move same along the coil, means connected to the coil and sliding contact and connectible to a source of electric current for energizing said rheostat, a rod formed from heat-conductive metal mounted within the tubular core of the rheostat and having at least one end projecting therefrom onto the outside of the handle, and a radiator having at least one heat-dissipating vane connected to the projecting end of the rod in heat-conductive relation thereto.

References Cited

UNITED STATES PATENTS

| 982,365 | 1/1911 | Horton | 318—269 |
| 1,562,007 | 11/1925 | Smith et al. | 338—177 X |
| 2,019,999 | 11/1935 | Schellenger | 338—141 X |

FOREIGN PATENTS

| 27,711 | 4/1833 | Netherlands. |
| 245,574 | 1/1926 | Great Britain. |

ANTHONY BARTIS, Primary Examiner

J. G. SMITH, Assistant Examiner

U.S. Cl. X.R.
338—184, 202